(12) United States Patent
Wild et al.

(10) Patent No.: US 6,770,374 B1
(45) Date of Patent: Aug. 3, 2004

(54) COMPOSITE ELEMENTS CONTAINING COMPACT POLYISOCYANATE POLYADDITION PRODUCTS

(75) Inventors: Heike Wild, Olching (DE); Hans-Juergen Reese, Olching (DE); Georg Knoblauch, München (DE); Thomas Bartz, Olching (DE); Mathäus Rank, Olching (DE); Heinz Forster, Wolfratshausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/701,963

(22) PCT Filed: May 22, 1999

(86) PCT No.: PCT/EP99/03545
§ 371 (c)(1), (2), (4) Date: Dec. 5, 2000

(87) PCT Pub. No.: WO99/64234
PCT Pub. Date: Dec. 16, 1999

(30) Foreign Application Priority Data

Jun. 5, 1998 (DE) .......................................... 198 25 083

(51) Int. Cl.$^7$ .............................................. B32B 27/40
(52) U.S. Cl. .................................... 428/425.8; 428/625
(58) Field of Search ............................. 428/425.8, 625; 528/76, 77

(56) References Cited

U.S. PATENT DOCUMENTS

| | | |
|---|---|---|
| 4,061,815 A | 12/1977 | Poole, Jr. |
| 4,304,080 A | 12/1981 | Freeman |
| 4,313,996 A | 2/1982 | Newman et al. |
| RE31,213 E | 4/1983 | Brachman |
| 4,673,102 A | 6/1987 | Bullock, Jr. |
| 4,678,707 A | 7/1987 | Shinozaki et al. |
| 4,680,227 A | 7/1987 | Aoyagi et al. |
| 4,681,816 A | 7/1987 | Hashimoto et al. |
| 4,709,781 A | 12/1987 | Scherzer |
| 4,739,722 A | 4/1988 | Rogstad |
| 4,756,943 A | 7/1988 | Koletzko |
| 4,758,299 A | 7/1988 | Burke |
| 4,850,297 A | 7/1989 | Rogstad |
| 4,883,717 A | 11/1989 | Kitamura et al. |
| 4,937,125 A | 6/1990 | Sanmartin et al. |
| 4,940,360 A | 7/1990 | Weholt |
| 4,942,080 A | 7/1990 | Hevel et al. |
| 4,978,582 A | 12/1990 | Stamm et al. |
| 4,992,323 A | 2/1991 | Vogelesang et al. |
| 5,007,225 A | 4/1991 | Teasdale |
| 5,030,488 A | 7/1991 | Sobolev |
| 5,093,204 A | 3/1992 | Watanabe et al. |
| 5,106,668 A | 4/1992 | Turner et al. |
| 5,109,096 A | 4/1992 | Hess et al. |
| 5,116,688 A | 5/1992 | Minamida et al. |
| 5,143,790 A | 9/1992 | Sattinger |
| 5,184,439 A | 2/1993 | Ward |

(List continued on next page.)

FOREIGN PATENT DOCUMENTS

| | | |
|---|---|---|
| EP | B 022 665 | 1/1981 |
| EP | A 058 970 | 9/1982 |
| EP | A 108 710 | 5/1984 |
| EP | B 248 547 | 12/1987 |
| EP | B 297 801 | 1/1989 |
| EP | 402728 | 12/1990 |
| EP | B 219 104 | 11/1992 |
| EP | A 512 183 | 11/1992 |
| EP | B 521 793 | 1/1993 |
| EP | B 559 568 | 9/1993 |
| EP | 602760 | 6/1994 |
| EP | 728783 | 8/1996 |
| EP | A 693 598 | 11/1996 |
| EP | B 754 815 | 1/1997 |
| EP | A 1072505 | 1/2001 |
| WO | WO-A 90/01598 | 2/1990 |
| WO | WO-A 91/19866 | 12/1991 |
| WO | WO-A 92/12006 | 7/1992 |
| WO | WO-A 94/26585 | 11/1994 |
| WO | WO-A 99/64233 | 12/1999 |
| WO | WO-A 99/64234 | 12/1999 |
| WO | WO-A 00/13890 | 3/2000 |
| WO | WO-A 00/30930 | 6/2000 |
| WO | WO-A 00/35746 | 6/2000 |
| WO | WO-A 00/59718 | 10/2000 |
| WO | WO-A 01/12499 | 2/2001 |

OTHER PUBLICATIONS

Oertel, G., ed. "Polyurethane Handbook", $2_{nd}$ ed., Hanser Publishers, New York: 1993, pp. 388–392.*

PCT Search Report Dated Oct. 13, 1999.

PCT Search Report Dated Jan. 1, 2000. (from Paper #5 filed Apr. 23, 2001).

Primary Examiner—James J. Seidleck
Assistant Examiner—Melanie Bissett
(74) Attorney, Agent, or Firm—Fernando A. Borrego

(57) ABSTRACT

Composite elements having the following layer structure:
(i) 2–20 mm of metal,
(ii) 10–100 mm of compact polyisocyanate polyaddition products obtainable by reacting (a) isocyanates with (b) polyether polyalcohols, if desired in the presence of (c) catalysts and/or (d) auxiliaries and/or additives,
(iii) 2–20 mm of metal.

6 Claims, No Drawings

U.S. PATENT DOCUMENTS

| | | |
|---|---|---|
| 5,198,975 A | 3/1993 | Baker et al. |
| 5,218,919 A | 6/1993 | Krulikowski, III et al. |
| 5,353,502 A | 10/1994 | Hattori et al. |
| 5,359,953 A | 11/1994 | Skaarup et al. |
| 5,391,686 A | 2/1995 | Jadhav et al. |
| 5,398,630 A | 3/1995 | Skaarup et al. |
| 5,424,113 A | 6/1995 | Ray et al. |
| 5,437,903 A | 8/1995 | Christensen |
| 5,442,028 A | 8/1995 | Fromwiller et al. |
| 5,477,797 A | 12/1995 | Stuart |
| 5,478,654 A | 12/1995 | Hargis et al. |
| 5,542,365 A | 8/1996 | Jurisch et al. |
| 5,647,933 A | 7/1997 | Christensen |
| 5,688,835 A | 11/1997 | Scherbel et al. |
| 5,733,966 A | 3/1998 | Cline et al. |
| 5,741,571 A | 4/1998 | Bowerman et al. |
| 5,773,783 A | 6/1998 | Bowerman et al. |
| 5,794,402 A | 8/1998 | Dumlao et al. |
| 5,797,235 A | 8/1998 | Bowerman et al. |
| 5,803,004 A | 9/1998 | Swann et al. |
| 5,834,082 A | 11/1998 | Day |
| 5,862,772 A | 1/1999 | Yancey et al. |
| 5,899,162 A | 5/1999 | Beaupreet et al. |
| 6,009,821 A | 1/2000 | Al-Rammah |
| 6,044,607 A | 4/2000 | Dumlao et al. |
| 6,050,208 A * | 4/2000 | Kennedy ............... 114/74 A |
| 6,070,378 A | 6/2000 | Dumlao et al. |
| 6,081,955 A | 7/2000 | Dumlao et al. |
| 6,092,350 A | 7/2000 | Dumlao et al. |
| 6,108,998 A | 8/2000 | Dumlao |
| 6,170,422 B1 | 1/2001 | Macander et al. |
| 6,182,409 B1 | 2/2001 | Visser |

\* cited by examiner

COMPOSITE ELEMENTS CONTAINING COMPACT POLYISOCYANATE POLYADDITION PRODUCTS

The present invention relates to composite elements having the following layer structure:
  (i) 2–20 mm, preferably 5–20 mm, particularly preferably 5–10 mm, of metal,
  (ii) 10–100 mm of compact polyisocyanate polyaddition products obtainable by reacting (a) isocyanates with (k) polyether polyalcohols, if desired in the presence of (c) catalysts and/or (d) auxiliaries and/or additives,
  (iii) 2–20 mm, preferably 5–20 mm, particularly preferably 5–10 mm, of metal.

The invention further relates to a process for producing these composite elements and to their use.

The construction of ships, for example ships' hulls and hold covers, bridges or high-rise buildings require the use of structural components which can withstand considerable external forces. Owing to these requirements, such structural components usually comprise metal plates or metal supports which are strengthened by means of an appropriate geometry or suitable struts. Thus, hulls of tankers usually consist, because of increased safety standards, of an inner and an outer hull, with each hull being made up of 15 mm thick steel plates which are connected to one another by steel struts about 2 m long. Since these steel plates are subjected to considerable forces, both the inner and outer steel shells are reinforced by welded-on reinforcing elements. Disadvantages of these classical structural components are both the considerable amounts of steel which are required and the time-consuming and labor-intensive method of manufacture. In addition, such structural components have a considerable weight resulting in a lower tonnage of the ship and increased fuel consumption. Furthermore, such classical structural elements based on steel require a great deal of maintenance since both the outer surface and the surfaces of the steel parts between the outer and inner shells regularly have to be protected against corrosion.

It is an object of the present invention to develop structural components which withstand high external forces and can he used, for example, in shipbuilding, bridge construction or construction of high-rise buildings. The structural components to be developed, also referred to as composite elements, should be able to serve as replacements for known steel structures and, in particular, have advantages in respect of weight, production process and maintenance requirements. In particular, the composite elements should be able to be produced simply and quickly in large sizes and also be able to be used in shipbuilding due to improved resistance to hydrolysis.

We have found that this object is achieved by the composite elements described at the outset.

The composite elements of the present invention are produced using polyether polyalcohols for the reaction with the isocyanates. The use of polyether polyalcohols offers substantial advantages due to improved resistance of the polyisocyanate polyaddition products to hydrolytic cleavage and because of the lower viscosity, in each case compared to polyester polyalcohols. The improved hydrolysis stability is particularly advantageous for use in shipbuilding. The lower viscosity of the polyether polyalcohols and the reaction mixture comprising the polyether polyalcohols for preparing (ii) makes possible more rapid and simpler filling of the space between (i) and (iii) with the reaction mixture for producing the composite elements. Owing to the considerable dimensions of, in particular, structural components in shipbuilding, low-viscosity liquids offer a considerable advantage.

The composite elements of the present invention can be produced by preparing, between (i) and (iii) compact polyisocyanate polyaddition products which adhere to (i) and(iii) by reacting (a) isocyanates with (b) polyether polyalcohols, if desired in the presence of (c) catalysts and/or (d) auxiliaries and/or additives.

The surfaces of (i) and/or (iii) to which (ii) adheres after production of the composite elements are preferably sandblasted. This sandblasting can be carried out by conventional methods. For example, the surfaces can be blasted with customary sand under high pressure and thus, for example, cleaned and roughened. Suitable equipment for such treatment is commercially available.

This treatment of th surfaces of (i) and (iii) which ar in contact with (ii) after the reaction of (a) with (b), if desired in th presence of (c) and/or (d) leads to considerably improved adhesion of (ii) to (i) and (iii). Sandblasting is preferably carried out immediately before introduction of the components for preparing (ii) into the space between (i) and (iii).

After the preferred treatment of the surfaces of (i) and (iii), these layers are preferably fixed in a suitable arrangement, for example parallel to one another. The spacing is usually selected such that the space between (i) and (iii) has a thickness of from 10 to 100 mm. (i) and (iii) can, for example, be fixed in place by means of spacers. The edges of the intermediate space are preferably sealed such that the space between (i) and (iii) can be filled with (a) and (b) and, if desired, (c) and/or (d) but these components are prevented from flowing out. Sealing can be carried out using customary plastic films or metal foils and/or metal plates which can also serve as spacers.

The layers (i) and (iii) are preferably customary metal plates, for example steel plates, having the thicknesses according to the present invention.

The space between (i) and (iii) can be filled either with (i) and (iii) aligned vertically or with (i) and (iii) aligned horizontally.

The filling of the space between (i) and (iii) with (a), (b) and, if desired, (c) and/or (d) can be carried out using feeding equipment, preferably continuously, for example by means of high- and low-pressure machines, preferably high-pressure machines.

The feed rate can be varied depending on the volume to be filled. To ensure homogeneous curing of (ii), the feed rate and the feeding equipment are selected such that the space to be filled can be filled with the components for preparing (ii) within 5–20 minutes.

As layers (i) and (iii), usually plates, use can be made of customary metals, for example iron, conventional steel, all types of alloy steel, aluminum and/or copper.

Both (i) and (ii) can be used in coated form, for example primed, painted and/or coated with customary plastics, for producing the composite elements of the present invention. Preferably, (i) and (iii) are us d in uncoated form and are particularly preferably cleaned, for example by customary sandblasting, before use.

The preparation of the compact polyisocyanate polyaddition products (ii), usually polyurethane and, if desired, polyisocyanurate products, in particular polyurethane elastomers, by reacting (a) isocyanates with (b) compounds which are reactive toward isocyanates, if desired in the presence of (c) catalysts and/or (d) auxiliaries and/or additives has been described many times. For the purposes of the present invention, compact polyisocyanate polyaddition products are ones which have no cellular structure as is customary, for example, for polyurethane foams. To achieve this compact structure, the addition of blowing agents to the starting components for preparing (ii) is avoided. To substantially avoid a foaming process, both the starting components (b) and, if used, (c) and (d) and also the surfaces of (i) and (iii) with which the reaction components come into contact should preferably be dry.

The water content of the reaction mixture comprising (a), (b) and, if used, (c) and/or (d) is preferably from 0 to 0.03% by weight, based on the weight of the reaction mixture. The water content of, in particular, the component (b) can be reduced to the appropriate level by, for example, distillation. It is also possible to add compounds which bind water and thus prevent a blowing reaction to the reaction mixture. Such compounds, for example molecular sieves, are generally known. For example, it is possible to use silicates and oxazolidines in a suitable, preferably finely divided, form. These compounds are preferably added to the reaction mixture, preferably the component (b), in amounts of from 0.05 to 5% by weight, based on the weight of the reaction mixture.

The starting materials (a), (b), (c) and (d) in the process of the present invention are described below by way of example:

Suitable isocyanates (a) are the aliphatic, cycloaliphatic, araliphatic and/or aromatic isocyanates, preferably diisocyanates, which are known per se and may have been modified by introduction of biuret and/or isocyanurate groups by generally known methods. Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate, lysine ster diisocyanates (LDI), hexamethylene 1,6-diisocyanate (HDI), cyclohexane 1,3- and/or 1,4-diisocyanate, hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, 1-isocyanato-3,3,5-trimethyl-5-isocyanatomethylcyclohexane (IPDI), tolylene 2,4- and/or 2,6-diisocyanate (TDI), diphenylmethane 4,4'-, 2,4'- and/or 2,2'-diisocyanate (MDI), polyphenylpolymethylene polyisocyanates and/or mixtures comprising at least two of the isocyanates mentioned. Furthermore, diisocyanates and/or polyisocyanates containing ester, urea, allophanate, carbodiimide, uretdione and/or urethane groups can be used in the process of the present invention. Preference is given to using 2,4'-, 2,2'- and/or 4,4'-MDI and/or polyphenylpolymethylene polyisocyanates, particularly preferably mixtures comprising polyphenylpolymethylene polyisocyanates and at least one of the MDI isomers.

As compounds (b) which are reactive toward isocyanates, use is made according to the present invention of polyether polyalcohols, advantageously those having a mean functionality of from 1 to 8, preferably from 1.5 to 6, and a molecular weight of from 400 to 8000.

Examples of suitable polyether polyalcohols are those which are obtainable by known methods by addition of alkylene oxides, for, example tetrahydrofuran, 1,3-propylene oxide, 1,2- or as 2,3-butylene oxide, styrene oxide or preferably ethylene oxides and/or 1,2-propylene oxide, onto customary initiator substances. Initiator substances which can be used are, for example, known aliphatic, araliphatic, cycloaliphatic and/or aromatic compounds which contain at least one hydroxyl group and/or at least one amino group. Examples of suitable initiator substances are ethanediol, diethylene glycol, 1,2- or 1,3-propanediol, 1,4-butanediol, 1,5-pentanediol, 1,6-hexanediol, 1,7-heptanediol, glycerol, trimethylolpropane, neopentyl glycol, sugars such as sucrose, pentaerythritol, sorbitol, ethylenediamine, propanediamine, neopentanediamine, hexamethylenediamine, isophoronediamine, 4,4'-diaminodicyclohexylmethane, 2-(ethylamino)ethylamine, 3-(methylamino)propylamine, diethylenetriamine, dipropylenetriamine and/or N, N'-bis(3-aminopropyl) ethylenediamine.

The alkylene oxides can be used individually, or alternately in succession or as mixtures. Preference is given to using alkylene oxides which lead to primary hydroxyl groups in the polyol. The polyols used are particularly preferably ones which hav b en alkoxylated with ethylene oxide at th end of the alkoxylation and thus have primary hydroxyl groups.

If desired, further compounds which are reactive toward isocyanates can be used as (b) in addition to the polyether polyalcohols, for example ones which contain hydroxyl, thiol and/or primary and/or secondary amino groups as groups which are reactive toward isocyanates, e.g. polyols selected from the group consisting of polyester polyalcohols, polythioether polyols, hydroxyl-containing polyacetals and hydroxyl-containing aliphatic polycarbonates or mixtures of at least two of the polyols mentioned. These compounds which may be used in addition to the polyether polyalcohols usually have a functionality of from 2 to 6 and a molecular weight of from 400 to 8000.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. The polyester polyols preferably have a functionality of from 2 to 4, particularly from 2 to 3, and a molecular weight of from 480 to 3000, preferably from 600 to 2000.

Further substances which are suitable as isocyanate-reactive compounds in addition to the polyether polyalcohols used according to the present invention are compounds which have a hydrocarbon skeleton comprising from 10 to 40 carbon atoms and from 2 to 4 groups which are reactive toward isocyanates. For the purposes of the present invention, hydrocarbon skeleton means an uninterrupted sequence of carbon atoms which is not interrupted as, for example, in the case of ethers by oxygen atoms. As such substances, hereinafter also referred to as (b3), it is possible to use, for example, castor oil and its derivatives.

Other isocyanate-reactive compounds which may be used in the process of the present invention in addition to the polyether polyalcohols used according to the present invention are diols and/or triols having molecular weights of from 60 to <400 as chain extenders and/or crosslinkers. The addition of chain extenders, crosslinkers or, if desired, mixtures thereof can prove to be advantageous for modifying the mechanical properties, e.g. the hardness. The chain extenders and/or crosslinkers preferably have a molecular weight of from 60 to 300. Suitable chain extenders/crosslinkers are, for example, aliphatic, cycloaliphatic and/or aralphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxy-ethyl) hydroquinone, triols such as 1,2,4- or 1,3,5-trihydroxy-cyclohexane, glycerol and trimethylolpropane, low molecular weight hydroxyl-containing polyalkylene oxides based on ethylene oxide and/or 1,2-propylene oxide and the abovementioned diols and/or triols as initiator molecules and/or diamines such as diethyltoluenediamine and/or 3,5-dimethylthio-2,4-toluenediamine.

If chain extenders, crosslinkers or mixtures thereof are employed for preparing the polyisocyanate polyaddition products, they are advantageously used in an amount of from 0 to 30% by weight, preferably from 2 to 20% by weight, based on the weight of all the isocyanate-reactive compounds (b) used.

Furthermore, aliphatic, araliphatic, cycloaliphatic and/or aromatic carboxylic acids can be used in addition to the polyether polyalcohols used according to the present invention in the preparation of (ii) to optimize the curing behavior. Examples of such carboxylic acids are formic acid, acetic acid, succinic acid, oxalic acid, malonic acid, glutaric acid, adipic acid, citric acid, benzoic acid, salicylic acid, phenylacetic acid, phthalic acid, ricinoleic acid, toluenesulphonic acid, derivatives of the acids mentioned, isomers of the acids mentioned and any mixtures of the acids mentioned. The proportion by weight of these acids can be from 0 to 5% by weight, preferably from 0.2 to 2% by weight, based on the total weight of (b).

The component (b) used is preferably a mixture comprising:
- (b1) from 40 to 99% by weight of polyether polyalcohol having a mean functionality of from 1.5 to 2.99 and a mean molecular weight of from 400 to 8000 and
- (b2) from 1 to 60% by weight of polyether polyalcohol having a mean functionality of from 3 to 5 and a mean molecular weight of from 150 to 8000.

The component (b) used is particularly preferably a mixture comprising:
- (b1) from 40 to 98% by weight of polyether polyalcohol having a mean functionality of from 1.5 to 2.99 and a mean molecular weight of from 400 to 8000,
- (b2) from 1 to 60% by weight of polyether polyalcohol having a mean functionality of from 3 to 5 and a mean molecular weight of from 150 to 8000 and
- (b3) from 1 to 50% by weight of at least one compound which is reactive toward isocyanates and has a hydrocarbon skeleton comprising from 10 to 40 carbon atoms and from 2 to 4 groups which are reactive toward isocyanates.

In particular, the preferred mixtures mentioned can further comprise the abovementioned carboxylic acids.

The weight ratio of polyether polyalcohols to polyester polyalcohols in the component (b) is preferably >100, particularly preferably >1000; in particular, no polyester polyalcohols are used as (b) for preparing (ii).

Furthermore, the curing behavior of the reaction mixture for preparing (ii) can be improved by use of amine-initiated polyether polyalcohols. The compounds (b) used, and also the components (c) and (d), preferably have as low as possible a water content in order to avoid formation of carbon dioxide by reaction of water with isocyanate groups.

As catalysts (c), it is possible to use generally known compounds which strongly accelerate the reaction of isocyanates with the compounds which are reactive toward isocyanates; preference is given to using a total catalyst content of from 0.001 to 15% by weight, in particular from 0.05 to 6% by weight, based on the weight of all the isocyanate-reactive compounds used. For example, the following compounds can be employed: triethylamine, tributylamine, dimethylbenzylamine, dicyclohexylmethylamine, dimethylcyclohexylamine, bis(N,N-dimethylaminoethyl) ether, bis(dimethylaminopropyl)urea, N-methylmorpholine or N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamin compounds such as triethanolamine, triisopropanolamine, N-methyldiethanolamin and N-ethyl-diethanolamine, dimethylaminoethanol, 2-(N,N-dimethylaminoethoxy) ethanol, N,N',N"-tris(dialkylaminoalkyl) hexahydrotriazines, e.g. N,N',N"-tris (dimethylaminopropyl)-s-hexahydrotriazine, iron(II) chloride, zinc chloride, lead octoate and preferably tin salts such as tin dioctoate, tin diethylhexanoate, dibutyltin dilaurate and/or dibutyl dilauryl tin mercaptide, 2,3-dimethyl-3,4,5,6-tetrahydropyrimidine, tetraalkylammonium hydroxides such as tetramethylammonium hydroxide, alkali metal hydroxides such as sodium hydroxide, alkali metal alkoxides such as sodium methoxide and potassium isopropoxide, and/or alkali metal salts of long-chain fatty acids having from 10 to 20 carbon atoms and possibly lateral OH groups.

It has been found to be very advantageous to carry out the preparation of (ii) in the presence of (c) in order to accelerate the reaction.

If desired, auxiliaries and/or additives (d) can be incorporated into the reaction mixture for preparing the polyisocyanate polyaddition products (ii). Examples which may be mentioned are fillers, surface-active substances, dyes, pigments, flame retardants, hydrolysis inhibitors, fungistatic and bacteriostatic substances.

Possible surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, e.g. diethylamine oleate, diethanolamine stearate, diethanolamine ricinoleate, salts of sulfonic acids, e.g. alkali metal or ammonium salts of dodecylbenzene- or dinaphthylmethanedisulfonic acid and ricinoleic acid. The surface-active substances are usually employed in amounts of from 0.01 to 5% by weight, based on 100% by weight of all the isocyanate-reactive compounds (b) used.

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl) ethylene diphosphate, dimethyl methanephosphonate, diethyl diethanolaminomethylphosphonate and also commercial halogen-containing flame-retardant polyols. Apart from the abovementioned halogen-substituted phosphates, it is also possible to use inorganic or organic flame retardants such as red phosphorus, hydrated aluminum oxide, antimony trioxide, arsenic oxide, ammonium polyphosphate and calcium sulfate, expandable graphite or cyanuric acid derivatives such as melamine, or mixtures of at least two flame retardants such as ammonium polyphosphates and melamine and also, if desired, maize starch or ammonium polyphosphate, melamine and expandable graphite and/or aromatic or aliphatic polyesters for making the polyisocyanate polyaddition products flame resistant. In general, it has been found to be advantageous to use from 5 to 50% by weight, preferably from 5 to 25% by weight, of the flame retardants mentioned, based on the weight of all the isocyanate-reactive compounds used.

For the purposes of the present invention, fillers, in particular reinforcing fillers, are the customary organic and inorganic fillers, reinforcing materials, weighting agents, agents for improving the abrasion behavior in paints, coatings, etc., known per se. Specific examples are: inorganic fillers such as siliceous minerals, for example sheet silicates such as antigorite, serpentine, hornblendes, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, and short metal or glass fibers. Suitable organic fillers are, for example: carbon, melamine, rosim, cyclopentadienyl resins and graft polymers and also cellulose fibers, polyamide, polyacrylonitrile, polyurethane or polyester fibers based on aromatic and/or aliphatic dicarboxylic esters and, in particular, carbon fibers. The inorganic and organic fillers can be used individually or as mixtures.

In the preparation of (ii), preference is given to using from 10 to 70% by weight of fillers, based on the weight of (ii), as (d) auxiliaries and/or additives. Preferred fillers are talc, kaolin, calcium carbonate, barite, glass fibers and/or glass microspheres. The size of the filler particles is preferably selected such that the introduction of the components for preparing (ii) into the space between (i) and (iii) is not hindered. The fillers particularly preferably have a particle size of <0.5 mm.

The fillers are preferably used in admixture with the polyol component in the reaction for preparing the polyisocyanate polyaddition products.

The fillers can serve to reduce the coefficient of thermal expansion of the polyisocyanate polyaddition products which is greater than, for example, that of steel and thus to match it to that of steel. This is particularly advantageous for obtaining a permanently strong bond between the layers (i), (ii) and (iii), since it reduces the stresses between the layers when temperature changes occur.

The weight of (ii) corresponds by definition to the weight of the components (a), (b) and, if used, (c) and/or (d) used for preparing (ii).

To prepare the polyisocyanate polyaddition products of the present invention, the isocyanates and the compounds which are reactive toward isocyanates are reacted in such amounts that the equivalence ratio of NCO groups of the isocyanates to the sum of the reactive hydrogen atoms of the compounds which are reactive toward isocyanates is 0.85–1.25:1, preferably 0.95–1.15:1 and in particular 1–1.05:1. If (ii) contains at least some isocyanurate groups, it is usual to employ a ratio of NCO groups to the sum of reactive hydrogen atoms of 1.5–60:1, preferably 1.5–8:1.

The polyisocyanate polyaddition products are usually prepared by the one-shot method or by the prepolymer method, for example by means of the high-pressure or low-pressure technique.

It has been found to be particularly advantageous to employ the two-component process and to combine the isocyanate-reactive compounds (b) and any catalysts (c) and/or auxiliaries and/or additives and fillers (d) as component (A) and preferably mix them intimately with one another, and to use the isocyanates as component (B).

The starting components are usually mixed at from 0 to 100° C., preferably from 20 to 60° C., and, as described above, introduced into the space between (i) and (iii). Mixing can be carried out mechanically by means of a stirrer or stirring screw or countercurrent mixing in the case of high-pressure processing. The reaction temperature, i.e. the temperature at which the reaction occurs, is usually >20° C., preferably from 50 to 150° C.

The polyisocyanate polyaddition products (ii) of the composite elements produced according to the present invention preferably have a modulus of elasticity of >275 MPa in the temperature range from −45 to +50° C. (in accordance with DIN 53457), an adhesion to (i) and (iii) of >4 MPa (in accordance with DIN 53530), an elongation of >30% in the temperature range from −45 to +50° C. (in accordance with DIN 53504), a tensile strength of >20 MPa (in accordance with DIN 53504) and a compressive strength of >20 MPa (in accordance with DIN 53421).

The composite elements which can be produced by the process of the present invention have the following advantages compared to known constructions:

Struts and similar stiffening elements become virtually completely superfluous. This leads to a considerable cost reduction in production due to savings in materials and to significantly simpler corrosion protection.

When used in shipbuilding, the reduced weight results in a higher tonnage or reduced fuel consumption.

Maintenance is significantly simplified, for example with regard to corrosion protection. As a result, maintenance does not have to be carried out as often.

The sandwich structure incorporating the polyisocyanate polyaddition product, for example the polyurethane elastomer, leads to better energy absorption and thus reduced crack propagation. Known steel structures have a strong tendency to crack formation on further strutting after perforation, i.e. the leak spreads over a large area of the ships' hull. The reduced crack propagation thus minimizes the damage risk in the case of accidents or under extreme stress. This improved safety standard is particularly advantageous for tankers.

The polyisocyanate polyaddition products based on polyether polyalcohols are more resistant to hydrolytic degradation than products based on polyester polyalcohols. This offers considerable advantages, particularly when the composite elements are used in shipbuilding.

The reaction mixture comprising the polyether polyalcohols for preparing (ii) has a significantly lower viscosity than reaction mixtures based on polyester polyalcohols. This makes possible simpler and quicker manufacture of the composite elements.

The preferred content of fillers in the preferred polyisocyanate polyaddition products reduces the coefficient of thermal expansion of (ii) and thus enables it to be matched to the coefficients of (i) and (iii). Stresses between (i), (ii) and (iii) due to temperature changes, in particular due to the ambient temperature, for example different water temperatures in the case of ships' hulls, can be reduced according to the present invention. The adhesion of (ii) to (i) and (iii) is lastingly improved as a result.

The preferred sandblasting of the surfaces of (i) and (iii) enables the adhesion of (ii) to (i) and (iii) to be significantly improved. The improved adhesion gives more stable and more durable structural elements.

Accordingly, the composite elements obtainable according to the present invention are used primarily in areas which require structural elements that withstand large forces, for example as structural components in shipbuilding, e.g. in ships' hulls, for example ships' double hulls comprising an outer and an inner wall, and hold covers, or in civil engineering constructions, for example bridges, or as structural elements in housing construction, particularly in high-rise dwellings.

The composite elements of the present invention should not be confused with classical sandwich elements which comprise a rigid polyurethane and/or polyisocyanurate foam core and are customarily used for thermal insulation. Such known sandwich elements would be unsuitable for the applications mentioned because of their comparatively low mechanical strength.

We claim:

1. A composite element having the following layer structure:
   (i) 2–20 mm of metal,
   (ii) 10–100 mm of compact polyisocyanate products comprising the reaction product of (a) a mixture of at least one polyphenylpolymethylene polyisocyanate and at least one isomer of diphenylmethane diisocyanate with (b) polyether polyalcohols, optionally in the presence of (c) catalysts and/or (d) auxiliaries and/or additives,
   (iii) 2–20 mm of metal, and
   wherein layer (ii) has a modulus of elasticity of >275 MPa in the temperature range from 45 to +50° C., an adhesion to layers (i) and (iii) of >4 MPa, an elongation of >30% in the temperature range from −45 to +50° C., a tensile strength of >20 MPa and a compressive strength of >20 MPa
   and wherein component (b) comprises:
   (b1) from 40 to 99% by weight of polyether polyalcohol having a mean functionality of from 1.5 to 2.99 and a mean molecular weight of from 400 to 8000, and
   (b2) from 1 to 60% by %weight of polyether polyalcohol having a mean functionality of from 3 to 5 and a mean molecular weight of from 150 to 8000.

2. A composite element as claimed in claim 1, wherein layer (ii) comprises from 10 to 70% by weight of fillers, based on the weight of (ii), as component (d) auxiliaries and/or additives.

3. A process for producing a composite element as claimed in any of claims 1 and 2, wherein compact polyisocyanate polyaddition products which adhere to (i) an (iii) arc prepared between (i) and (iii) by reacting (a) isocyanates with (b) polyether polyalcohols, optionally in the presence of (c) catalysts and/or (d) auxiliaries and/or additives.

4. A composite element obtainable by a process as claimed in claim 3.

5. A composite element having the following layer structure:
   (i) 2–20 mm of metal,
   (ii) 10–100 mm of compact polyisocyanate products comprising the reaction product of (a) a mixture of at least one polyphenylpolymethylene polyisocyanate and at least one isomer of diphenylmethane diisocyanate with (b) polyether polyalcohols, optionally in the presence of (c) catalysts and/or (d) auxiliaries and/or additives,
   (iii) 2–20 mm of metal, and
   wherein layer (ii) has a modulus of elasticity of >275 MPa in the temperature range from −45 to +50° C., an adhesion to layers (i) and (iii) of >4 MPa, an elongation of >30% in the tempers range from −45 to +50° C., a tensile strength of >20 MPa and a compressive strength of >20 MPa
   and wherein (b) is a mixture comprising:
   (b1) from 40 to 98% by weight of polyether polyalcohol having a mean functionality of from 1.5 to 2.99 and a mean molecular weight of from 400 to 8000,
   (b2) from 1 to 59% by weight of polyether polyalcohol having a mean functionality of from 3 to 5 and a mean molecular weight of from 150 to 8000 and
   (b3) from 1 to 50% by weight of at least one compound which is reactive toward isocyanates and has a hydrocarbon skeleton comprising from 10 to 40 carbon atoms and from 2 to 4 groups which are reactive toward isocyanates.

6. A composite element as claimed in claim 5, wherein layer (ii) comprises from 10 to 70% by weight of fillers, based on the weight of (ii), as component (d) auxiliaries and/or additives.

* * * * *